(12) United States Patent
Bourget

(10) Patent No.: US 7,200,306 B2
(45) Date of Patent: Apr. 3, 2007

(54) OPTICAL FIBER CABLE WITH A CENTRAL REINFORCING ELEMENT MECHANICALLY COUPLED DIRECTLY TO THE OPTICAL FIBERS

(75) Inventor: Vincent Bourget, Marly le Roi (FR)

(73) Assignee: Daka Comteo B.V., Amsterdam (NL)

( * ) Notice: Subject to any disclaimer, the term of this patent is extended or adjusted under 35 U.S.C. 154(b) by 0 days.

(21) Appl. No.: 10/830,017

(22) Filed: Apr. 23, 2004

(65) Prior Publication Data

US 2004/0213528 A1   Oct. 28, 2004

(30) Foreign Application Priority Data

Apr. 25, 2003   (FR) .................................. 03 05094

(51) Int. Cl.
*G02B 6/44*   (2006.01)
*G02B 6/00*   (2006.01)

(52) U.S. Cl. ........................................ 385/103; 385/100

(58) Field of Classification Search ................ 385/102, 385/103

See application file for complete search history.

(56) References Cited

U.S. PATENT DOCUMENTS 6,011,887 A * 1/2000 Kamei et al. ................ 385/103
6,463,199 B1   10/2002 Quinn

FOREIGN PATENT DOCUMENTS

| EP | 0 015 425 A2 | 9/1980 |
|---|---|---|
| EP | 0 084 388 A2 | 7/1983 |
| GB | 1 488 528 A | 10/1977 |
| JP | 56014207 A * | 2/1981 |
| JP | 2-238412 | 9/1990 |
| JP | 7-65641 | 3/1995 |

* cited by examiner

*Primary Examiner*—Sung Pak
(74) *Attorney, Agent, or Firm*—Sughrue Mion, PLLC

(57) ABSTRACT

The invention relates to the field of optical fiber cables, and more particularly to the field of low cost optical fiber cables. It is an optical fiber cable comprising a central reinforcing element (1), a plurality of optical fibers (4) surrounding the central reinforcing element (1), the bare optical fibers (4) being pressed in contact against the central reinforcing element (1) in such a manner as to be mechanically coupled to the central reinforcing element (1). The optical fiber cable of the invention is suitable for use in particular as a distribution cable or as an access cable in local networks.

49 Claims, 1 Drawing Sheet

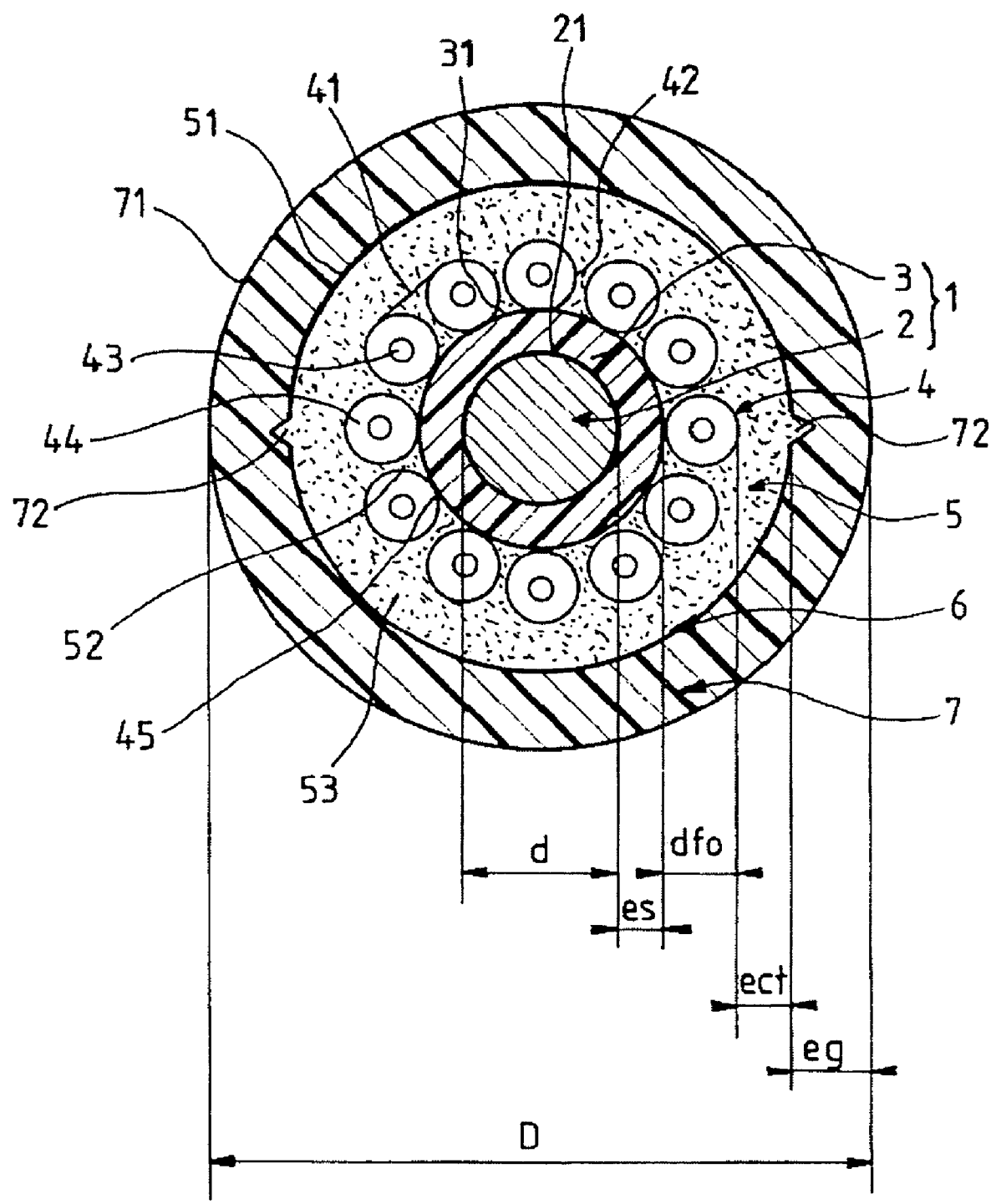
FIG_1

OPTICAL FIBER CABLE WITH A CENTRAL REINFORCING ELEMENT MECHANICALLY COUPLED DIRECTLY TO THE OPTICAL FIBERS

The invention relates to the field of optical fiber cables, and more particularly to the field of low cost optical fiber cables. This field of low cost cables requires optical fiber cables of cost price that is relatively low, but presenting properties that are decent in an environment of constraints that are nevertheless moderate. This type of low cost optical fiber cable must preserve adequate optical transmission properties in an environment at relatively low temperature, and must withstand a certain radial flattening threshold and also a certain longitudinal traction threshold. However, this type of low cost cable need not be adapted to environments at very low temperatures or to mechanical stresses that are very high, unless significantly degraded optical transmission properties are acceptable for the intended optical transmission system making use of the cable. The preferred application of the invention for this type of low cost optical fiber cable is use in local networks. In a local network, the capacity demand in terms of number of optical fibers is generally relatively small, however the size of the conduits in which the cables are to be installed is likewise often relatively small. The type of low cost cable to which the invention applies is preferably a low capacity optical fiber cable presenting an outside diameter that is relatively small. Unless mentioned to the contrary below, the term "diameter" without any further details should always be considered as being the outside diameter.

In a first kind of prior art, optical fiber cable structures are known that make use of so-called "loose tube" elements which are rigid tubes containing optical fibers immersed in a gel and possessing a certain amount of freedom to move inside the rigid tubes. The elasticity modulus, generally referred to as "Young's modulus" for optical fibers, generally made of silica, is considerably greater than that for the rigid tubes which are generally made of plastics material. The optical fibers must be capable of accommodating the variations in the dimensions of the rigid tubes. In order to accommodate longitudinal extension, e.g. caused by traction being exerted on the cable, the optical fibers generally present excess length. In order to be able to accommodate longitudinal contraction, e.g. caused by a reduction in the temperature of the cable, particularly when the optical fibers already present excess length relative to the rigid tubes, the optical fibers must have a large amount of room available within the rigid tubes, thereby increasing the diameter of the tubes, which rapidly leads to corresponding cable diameters that are large, thereby providing cables that are bulky and therefore expensive and poorly adapted to being "blown" along small-diameter conduits. The prior art "lose tube" structure is therefore not suitable. The rigid tubes are generally placed around a central reinforcing element. By way of example, one such prior art cable is described in European patent No. EP 0 320 069. Another such prior art cable is likewise shown in FIG. 5 of U.S. Pat. No. 6,463,199, with a variant which consists in replacing the gel contained in the rigid tubes by a material that is solid and flexible while simultaneously allowing the optical fibers a certain amount of freedom to move in the rigid tubes. The use of a plurality of rigid tubes each containing a plurality of optical fibers also leads to cable diameters that are too large. In addition, rigid tubes of very small diameter generally present problems of kinking and problems of convenience when injecting filler material, regardless of whether that material is a grease, a gel, or some other substance coating the optical fibers contained within the rigid tubes.

In a second kind of prior art, optical fiber cable structures are known that make use of a plurality of lateral reinforcements disposed symmetrically and embedded in the outer sheath of the cable. By way of example, one such prior art cable is shown in FIG. 4 of U.S. Pat. No. 6,463,199. If the lateral reinforcements are of small diameter, then they do not have sufficient effect on their own to assist the optical fibers in accommodating the variations in the dimensions of the cable. In contrast, if the lateral reinforcements are of diameter that is sufficiently large, then the diameters of two symmetrical lateral reinforcements plus the two extra thicknesses of the outer sheath for holding them in place lead to an outside diameter for the cable that is too great.

Consequently, the invention deals with the problem of low cost optical fiber cables of low capacity that also present a small diameter. For this purpose, the cable structures taken into consideration exclude so-called "lose tube" rigid tube structures containing optical fibers that are free to move inside said rigid tubes, and also exclude symmetrical lateral reinforcements embedded in the outer sheath insofar as they are of large diameter, it being understood that small diameter symmetrical lateral reinforcements embedded in the outer sheath are not excluded, but are considered as being insufficient on their own since one or more other reinforcements are then considered as being necessary for the reasons mentioned above. The invention proposes an optical fiber cable structure based on using a central reinforcing element to which bare optical fibers are directly coupled mechanically by contact. The structure is said to be "tight" since the optical fibers are not free to move to accommodate longitudinal variations in the dimensions of the cable, since they are mechanically coupled to the central reinforcing element by being in contact therewith.

The invention provides an optical fiber cable comprising a central reinforcing element, a plurality of optical fibers surrounding the central reinforcing element, the cable being characterized in that the bare optical fibers are pressed into contact against the central reinforcing element so as to be mechanically coupled to the central reinforcing element.

Firstly, a bare optical fiber is conventionally defined as being constituted firstly by a core with cladding for guiding light and constituting the optical fiber proper and secondly by one or more coverings that do not guide light, and conventionally two coverings that are generally applied around the optical fiber proper while it is being drawn from a preform. Marking, in particular colored marking, may also be applied in or on the covering or in or on one or more of the coverings of the optical fiber. The optical fiber presenting a core, cladding, and one or more coverings applied during fiber-drawing, possibly together with one or more markings, constitutes the "bare" optical fiber. A bare optical fiber usually has a diameter that is standardized to about 250 micrometers (µm). In any event the diameter of a bare optical fiber is less than 300 µm. Optical fibers reinforced by one or more layers of additional mechanical protection are not referred to as "bare" optical fibers, and they are of a diameter that is generally considered to be greater than 300 µm, for example a diameter of certain reinforced optical fibers is 900 µm. Similarly, the assembly constituted by a tube containing a single optical fiber embedded in a filler material cannot be considered as being a bare optical fiber. Bare optical fibers are preferably single mode optical fibers, but they could equally well be multimode optical fibers.

Optical fibers are not necessarily bare in the cable, they may be partially coated in a buffer material intended specifically to protect them from mechanical stresses. However, over at least a portion of the bare optical fiber, there is contact between the bare optical fiber and the central reinforcing element, and thus the central reinforcing element touches a portion of the bare optical fiber, i.e. a portion of the outer covering applied to the optical fiber while it is being drawn. Although the contact between the bare optical fibers and the central reinforcing element is direct contact, it is nevertheless considered that a very fine layer of liquid or a viscous film applied to the central reinforcing element and/or to the bare optical fibers during assembly of the cable for the purpose of avoiding damage to the bare optical fibers in particular when assembly is performed at high speed, remains within the ambit of the invention defined in terms of contact between the central reinforcing element and the bare optical fibers, providing the bare optical fibers remain mechanically coupled to the central reinforcing element. The mechanical coupling by contact is referred to as "direct" mechanical coupling, in contrast to indirect mechanical coupling in which there is no contact at all between the bare optical fibers and the central reinforcing element, since one or more materials of significant thickness lie between the bare optical fibers and the central reinforcing element, as in the first kind of prior art, for example. In addition, since the optical fibers are pressed against the central reinforcing element, the major fraction of the film will be expelled by the pressure between the bare optical fiber and the central reinforcing element, and any remaining layer of film between the central reinforcing element and the bare optical fiber at their point of contact will be of very small thickness. Direct contact, i.e. without the slightest layer of liquid or viscous film between the central reinforcing element and the bare optical fibers is nevertheless preferred, since it provides better mechanical coupling between the central reinforcing element and the bare optical fibers.

The bare optical fibers are pressed into contact against the central reinforcing element, which means that the contact between the bare optical fiber and the central reinforcing element is not mere contact, but contact with a certain amount of pressure between the bare optical fiber and the central reinforcing element, so that the optical fiber is mechanically coupled to the central reinforcing element, which presents behavior in contraction and extension that is comparable to that of the bare optical fiber, as contrasted with the behavior of plastics material, in particular of the kind used for making rigid tubes of the "loose tube" type. This pressure must naturally remain sufficiently low to avoid degrading the transmission properties of the optical fiber, and in particular its attenuation, unless the system using the cable of the invention allows or can accommodate such degradation which should nevertheless always remain relatively small. An advantageous type of central reinforcing element described below enables the pressure of the bare optical fiber against the central reinforcing element to be increased without significantly reducing the transmission properties of the optical fibers, and in particular without increasing their attenuation. This pressing of the bare optical fibers against the central reinforcing element excludes a structure of the grooved rod type in which the optical fibers have a certain amount of freedom to move in the cavities of the grooved rod. Such a grooved rod structure is also known in the prior art, and it is similar in principle to the freedom of movement allowed to optical fibers in "loose tube" type structures; in such a "grooved rod" structure, the optical fibers are not mechanically coupled to the central reinforcing element which is constituted by the grooved rod. It would be possible to provide such a grooved rod structure with bare optical fibers pressed along their entire length against the grooved rod so that mechanical coupling exists between the grooved rod and the optical fibers with the rod then acting as a central reinforcing element, however that would present little advantage in practice insofar as the diameter of the resulting cable would be relatively large. Such a cable could optionally include a filler material surrounding the optical fibers situated in the cavities of the grooved rod, said filler material preferably being solid or flexible, and said material would press the bare optical fibers against the walls of the cavities in the grooved rod. Furthermore, a grooved rod structure is a structure that is relatively expensive because of the complex shape of the grooved rod. In a cross-section plane of the cable, the central reinforcing element used in a cable of the invention is preferably substantially circular in shape and not of a more complex shape including cavities like those in a grooved rod.

The direct mechanical coupling between the optical fibers and the central reinforcing element enables the central reinforcing element to assist the optical fibers in better accommodating variations in the longitudinal dimensions of the cable. This direct mechanical coupling is obtained by contact as defined above so the optical fibers cannot constitute a ring made up of a plurality of concentric layers around the central reinforcing element since all of the transmission optical fibers situated around the central reinforcing element must be in contact with the central reinforcing element. That is why the optical fibers are preferably disposed in a single layer around the central reinforcing element. Like the central reinforcing element, this single layer presents an outside shape in a cross-section plane of the cable that is advantageously circular.

The invention thus provides an optical fiber cable comprising: a central reinforcing element; a layer of optical fibers surrounding the central reinforcing element; a buffer layer surrounding the layer of optical fibers; and an outer sheath surrounding the buffer layer; the cable being characterized in that it has only a single layer of optical fibers surrounding the central reinforcing element; in that the buffer layer presses the bare optical fibers into contact against the central reinforcing element in such a manner as to couple them mechanically to the central reinforcing element; and in that the majority of the volume of the buffer layer is constituted by a material that is both solid and flexible.

In this case, the cable has only one layer of optical fibers surrounding the central reinforcing element. In a cross-section plane of the cable, the central reinforcing element is generally circular in shape so the layer of optical fibers is likewise generally in the form of a ring having inside and outside diameters that are circular.

The buffer layer acts as a buffer, i.e. it protects the optical fibers, in particular against mechanical stresses exerted on the cable by the outside medium. In order to protect the optical fibers in optimum manner, the buffer layer preferably penetrates at least in part into the interstices situated between the optical fibers. The majority of the volume of the buffer layer is constituted by a single material that is both solid and flexible. In the volume of the buffer layer, there may nevertheless be contained, as a minority, other elements such as, for example, reinforcing roving of solid and rigid material but that preferably does not come into contact directly with the optical fibers in order to avoid degrading their optical properties, even if only to a small extent. The material is solid in contrast to the liquid materials of the prior art such as grease or viscous or semi-liquid gel. The solid material enables a certain amount of integrity to be maintained for the ordered disposition of the structure of the layer of optical fibers. The material is flexible, in contrast to the rigid materials of the prior art such as loose tube type rigid tubes or reinforcing elements. In somewhat more quantitative manner, whereas a loose tube rigid material has a modulus of elasticity that is relatively high, e.g. about 2400 megapascals (MPa), and a sheathing material of the low density polyethylene (LDPE) or of the high density polyethylene (HDPE) type has a modulus of elasticity equal respectively to about 250 MPa or of about 550 MPa, the flexible material used as a buffer material has a modulus of elasticity that is preferably less than 150 MPa, or indeed less than 100 MPa, and advantageously lies in the range 30 MPa to 50 MPa, where all of the above values expressed in MPa for modulus of elasticity (also known as Young's modulus) are given for ambient temperature, i.e. typically 25° C. Another way of expressing the distinction drawn between a rigid material and a flexible material is to say firstly that if a rigid material were to exert a pressure on an optical fiber in the same manner as the buffer layer presses the bare optical fibers against the central reinforcing element, then the transmission properties of the optical fibers (such as their attenuation) would be significantly degraded, whereas when a flexible material exerts pressure on the optical fiber, e.g. when the buffer layer presses the bare optical fibers against the central reinforcing element, the transmission properties of the optical fibers (such as their attenuation, for example) are degraded little or not at all. The flexible material used for the buffer layer may be constituted, for example, by Hytrel G3548L (registered trademark) or by HTR 8351 (registered trademark), available from Du Pont de Nemours (registered trademark).

The outer sheath is the final layer of the cable, the layer that is to come into contact with the outside medium. It is generally a layer for providing mechanical and chemical protection against the medium outside the cable, i.e. the environment. The buffer layer is a layer that often acts as a damper cushion between the outer sheath and the optical fibers. The outer sheath may optionally be made of the same material as the buffer layer, providing said material is suitable for providing effective protection against the environment.

The invention also provides an optical fiber cable comprising: a central reinforcing element; a layer of optical fibers surrounding the central reinforcing element; a buffer layer surrounding the layer of optical fibers; and an outer sheath surrounding the buffer layer; the cable being characterized in that it has only a single layer of optical fibers surrounding the central reinforcing element; in that the buffer layer presses the optical fibers against the central reinforcing element in such a manner as to couple the optical fibers mechanically to the central reinforcing element by contact between the bare optical fibers and the central reinforcing element, said mechanical coupling reducing relative longitudinal movements between the optical fibers and the central reinforcing element during temperature variations of the cable; and in that the portion of the buffer layer in contact with the bare optical fibers is constituted by a material that is both solid and flexible so as to withstand radial flattening without exerting damaging mechanical stress on said optical fibers.

The main advantage of the mechanical coupling is to reduce relative longitudinal movements between the optical fibers and the central reinforcing element during temperature variations of the cable. When the temperature of the cable varies, the length of the central reinforcing element varies little, thus enabling the optical fibers, which are coupled mechanically directly thereto, to see their own length vary little in like manner, while nevertheless allowing the central reinforcing element to withstand the major part of longitudinal mechanical stresses. The mechanical coupling also enables the optical fibers to see their own length vary little, while nevertheless enabling little of the longitudinal mechanical stresses, e.g. in the event of traction being exerted on the cable.

The portion of the buffer layer in contact with the bare optical fibers is constituted by a material that is both solid and flexible so as to withstand radial flattening without exerting damaging mechanical stress on said optical fibers. The material of this portion of the buffer layer is solid, thus enabling it to withstanding radial flattening without deforming excessively, thus preventing the flattening stress from acting directly on the bare optical fibers. The material of this portion of the buffer layer is sufficiently flexible to absorb mechanical stresses that are damaging for the optical fibers instead of transmitting them to the optical fibers. A mechanical stress is said to be damaging if, when acting on an optical fiber, it runs a high risk of damaging it, i.e. of degrading its optical properties significantly, or beyond the amount acceptable for the application system in which the cable is used.

The optical fibers are preferably disposed helically or in an SZ configuration around the central reinforcing element, thereby giving them a small amount of extra length and improving the performance of the cable in bending. In addition, the helical or SZ disposition enables the optical fibers to be pressed better against the central reinforcing element, since otherwise in the possible circumstance of optical fibers being disposed rectilinearly along the central reinforcing element, all of the force pressing the fibers against the central reinforcing element is taken up by the buffer layer and/or by any wrapping means.

The buffer layer is preferably mechanically coupled to the optical fibers that it surrounds, thus strengthening the assembly constituted by the central reinforcing element, the optical fibers, and the buffer layer, and enabling behavior in extension and contraction that is comparable for each of the embodiments constituting said assembly; as a result the overall behavior of the cable is more uniform, thereby constituting an improvement.

The buffer layer is preferably constituted essentially by a material that is solid and flexible as explained above. The buffer layer may also include other elements such as reinforcing roving made of material that is solid and rigid. Nevertheless, the buffer layer is advantageously constituted exclusively by a single material which is said solid and flexible material.

The flexible material has a modulus of elasticity, also known as Young's modulus, which is considerably smaller than that of a rigid material. The flexible material essentially constituting the buffer layer enables the optical fibers to be subjected to less radial mechanical stress coming from the outside medium. Thus, the use of a flexible material for the buffer layer adds no or very little additional attenuation for the optical fibers. Said flexible material is tearable, so it does not prevent access to the optical fibers. Said solid and flexible material is constituted, for example, by a solid elastic material. Said solid and flexible material may also be constituted, for example, by a foam. This solid and flexible material excludes a material that is liquid, viscous, or semi-liquid, as is the case, for example, of the greases used for filling loose tubes.

In order to be tearable, the buffer layer must not be too thick. The radial thickness of the portion of the buffer layer situated beyond the circle circumscribing the layer of optical fibers is sufficiently small for the buffer layer to be easy to tear without using a tool, i.e. using bare hands. The buffer layer is easily torn, since once a tear has been initiated it can be propagated longitudinally over a long distance, e.g. several meters, in a single movement performed by the operator, thus enabling a length of optical fiber to be laid bare that is sufficient for making a splice between two segments of cable, for example, by performing an operation that is simple and quick to perform. Accessibility of the optical fibers is important, particularly in local networks. In addition, since this material is relatively expensive, extruding a buffer layer that is thin makes it possible to further decrease the cost of a low cost cable. Furthermore, a relatively thin buffer layer improves the thermal performance of the cable, since it enables the cable to behave in a manner that is more uniform with temperature, and that is closer to the behavior of the central reinforcing element. Consequently, having a buffer layer of relatively small thickness provides three advantages: it facilitates access to the optical fibers, it improves the thermal performance of the cable, and it also reduces the diameter and the cost of the cable. A relatively small thickness for the buffer layer thus makes it possible to achieve an excellent compromise between optical transmission properties, cost, and the practical nature of use in local networks for low cost optical cables of the invention.

In order to make it easier to obtain good properties of tearability and of variation in length as a function of temperature, the radial thickness of the portion of the buffer layer situated outside the circle circumscribing the layer of optical fibers preferably lies in the range 0.1 mm to 0.5 mm, and advantageously lies in the range 0.15 mm to 0.40 mm, depending on the materials used and the number of optical fibers surrounding the central reinforcing element. In order to further decrease the diameter and the cost of the cable, it is advantageous to select a radial thickness for the portion of the buffer layer situated outside the circle circumscribing the layer of optical fibers to be less than the diameter of a bare optical fiber, which diameter is equal to about 250 μm. The minimum thickness for the buffer layer is limited, in fact, only by the quality of the material used for the buffer layer that needs to press the optical fibers against the central reinforcing element, and also by the level of radial mechanical stresses that are liable to be transmitted through the outer sheath from the medium outside the cable.

The central reinforcing element preferably comprises a central core surrounded by outer sheathing, the outer sheathing being mechanically coupled to the central core by contact with the central core, and the modulus of elasticity of the outer sheathing being less than the modulus of elasticity of the central core. The ratio between the modulus of elasticity of the central core and the modulus of elasticity of the outer sheathing is preferably significantly greater than 1, for example greater than a factor of 10 or indeed greater than a factor of 100. The central core is relatively rigid and often presents a surface that is not perfect, i.e. that is slightly rough. Direct contact between the optical fibers and the central core of the central reinforcing element would run the risk of exerting mechanical stresses of the micro-bend type on the optical fibers, thereby degrading their optical transmission properties, and in particular their attenuation. However, if the application system using the cable can accommodate a certain amount of degradation in the optical properties, and/or if the central core does not present a modulus of elasticity that is too great, and/or if the surface state of the central core is sufficiently smooth, then it remains possible to use a central reinforcing element comprising no more than the central core, even though a two-layer central reinforcing element comprising a central core surrounded by outer sheathing is nevertheless preferred. Under such circumstances, and preferably, the central core has a modulus of elasticity that is great enough to withstand traction being exerted on the cable, whereas the outer sheathing has a modulus of elasticity that is small enough to absorb at least in part the radial mechanical stresses exerted by the central core on the optical fibers. Thus, the central core, e.g. constituted by glass fibers embedded in resin or a bar of metal, conserves all of the effectiveness of the central reinforcing element, whereas the outer sheathing, e.g. made of an elastic material in solid form (i.e. non-perforated) or in foam form and possibly the same material as that used for the buffer layer, protects the optical fibers from radial stresses that might be exerted on them by the central core of the central reinforcing element. The ratio between the diameter of the central core and the thickness of the outer sheathing is great enough to ensure that the behavior of the central reinforcing element in response to variations in the temperature of the cable is closer to that of the central core than it is to that of the outer sheathing, thereby enabling better mechanical coupling to be obtained between the optical fibers and the central core of the central reinforcing element, and also enabling good equilibrium to be obtained throughout the cable between materials that present large amounts of longitudinal variation and materials that present small amounts of longitudinal variation. For good mechanical coupling between the optical fibers and the central core of the central reinforcing element, thus enabling the optical fibers to be mechanically coupled with a material having temperature behavior similar to their own temperature behavior, which is not the case with the material constituting the buffer layer or the outer sheathing of the central reinforcing element, the ratio between the diameter of the central core and the thickness of the outer sheathing is preferably greater than 4. In the above, the central reinforcing element is described as comprising a solid and rigid central core surrounded by solid and flexible outer sheathing; the central reinforcing element is preferably constituted by said central core surrounded by said outer sheathing, and it preferably does not comprise any other element.

In order to obtain good mechanical coupling between the central core and of the central reinforcing element and the optical fibers, in particular when the outer covering is not very thin compared with the diameter of the central core, a variant consists in using wrapping means such as reinforcing roving or a separator tape, enabling the optical fibers to be pressed with more force against the central reinforcing element and enabling the optical fibers to be better coupled mechanically to the central core, even when the outer sheathing of the central reinforcing element is relatively thick. Consequently, and preferably, the cable also has wrapping means for reinforcing the force with which the bare optical fibers are pressed against the central reinforcing element. Nevertheless such wrapping means are not essential. Advantageously, the wrapping means are reinforcing and wrapping roving placed helically around the buffer layer and in contact with the buffer layer. In a variant, the wrapping means may also be constituted by a separator tape placed helically around the buffer layer and in contact with the buffer layer. The reinforcing roving, like the separator tape, also acts as a separator, i.e. while the outer sheath is being extruded on the buffer layer, it prevents adhesion taking place between the outer sheath and the buffer layer, which would make it more difficult to gain access to the optical fibers without tearing away the buffer layer together with the outer sheath.

The buffer layer is constituted for the most part by a material that is solid and flexible. Preferably, there is no liquid, viscous, or semi-liquid element in contact with the optical fibers. Advantageously, the cable itself does not have any liquid, viscous, or semi-liquid element, in which case the cable is fully dry, thus making it more convenient to handle, particularly when making connections. In a variant, a liquid separator is placed at the interface between the bare optical fibers and the central reinforcing element in just sufficient quantity to prevent the optical fibers being damaged while they are being assembled around the central reinforcing element: this variant which is less advantageous in terms of handling the cable, can nevertheless be used in certain circumstances, for example when assembling the cable at high speed, in order to avoid any risk of damaging the optical fibers while they are being pressed against the central reinforcing element. The liquid separator should not be used in excessive quantity since that would eliminate the mechanical coupling between the optical fibers and the central reinforcing element.

The method of manufacturing a cable of the invention is preferably extremely simple: it can even consist in a stage of extruding (advantageously at high speed) the buffer layer onto the optical fibers assembled around the central reinforcing element, followed by a step of extruding (advantageously at high speed) the outer sheath on the buffer layer; in which case the method advantageously comprises only two high speed extrusion steps.

In a variant, instead of being constituted solely by optical fibers, the optical fiber layer comprises optical fibers and a few filler elements, thus making it possible to use the same type of cable structure for various capacities in terms of number of optical fibers. For certain portions of the network, the ratio between the number of optical fibers included in the cable and the diameter of the cable is not optimized, but it is then possible to use the same type of cable for different segments of the network having capacities that are different in terms of numbers of optical fibers.

In applications where diameter must remain particularly small, the optical fiber cable of the invention is preferably constituted, in succession from the center towards the periphery, by a central reinforcing element comprising a central core surrounded by outer sheathing, by a layer of optical fibers, by a buffer layer of material that is solid and flexible, optionally including reinforcing roving, by optional wrapping roving possibly also serving as reinforcement, and by an outer sheath. Said cable thus includes no other element. The reinforcing roving embedded in the buffer layer, like the wrapping roving situated around the buffer layer are not essential. An optical fiber cable of the invention, optimized in terms of small diameter and simplicity, is a cable which is advantageously constituted in succession from the center towards the periphery by a central reinforcing element comprising a central core surrounded by outer sheathing, by a layer of optical fibers, by a buffer layer constituted by a single solid and flexible material, and by an outer sheath. Said cable has no other element.

In certain major arteries of a network, consideration can be given to using macro-cables combining a plurality of low cost, low capacity cables of the invention coming from smaller arteries.

In a first preferred embodiment, the optical fiber cable of the invention comprises no more than six optical fibers and the outside diameter of said cable is less than 2 mm. By way of example, the outside diameter of the cable may be about 1.7 mm.

The cable has six elements disposed around the central reinforcing element, the six elements comprising at least two optical fibers, in which case the cable has no more than four other elements which are filler elements, up to a maximum of six optical fibers, in which case there are no other elements, and consequently no filler elements. The filler elements are preferably mechanically coupled to the central reinforcing element, but that is not essential. The configuration comprising a single optical fiber and five filler elements could theoretically be envisaged, but is economically disadvantageous, since other solutions exist for passing a single optical fiber, such as, for example, a reinforced optical fiber having additional protective peripheral layers. This solution using a single optical fiber is of decreasing advantage with increasing number of elements surrounding the central reinforcing element, and consequently with likewise increasing diameter of the central reinforcing element and of the cable as a whole.

In a second preferred embodiment, the optical fiber cable of the invention comprises no more than twelve optical fibers and the outside diameter of said cable is less than 2.5 mm. The outside diameter of the cable is equal to about 2 mm, for example. The cable has twelve elements placed around the central reinforcing element, including at least two optical fibers, in which case it has no more than ten other elements that are filler elements, and up to a maximum of twelve optical fibers, in which case it has no other elements, and consequently no filler elements. The filler elements are preferably mechanically coupled to the central reinforcing element, but that is not essential.

In a third preferred embodiment, the optical fiber cable of the invention comprises no more than twenty-four optical fibers and the outside diameter of said cable is less than 3.5 mm. By way of example, the outside diameter of the cable is about 3.2 mm. The cable comprises twenty-four elements placed around the central reinforcing element, including at least two optical fibers, in which case it includes no more than twenty-two other elements which are filler elements, and it can include up to a maximum of twenty-four optical fibers, in which case there are no other elements and consequently no filler elements. The filler elements are preferably mechanically coupled to the central reinforcing element, but that is not essential.

Other embodiments comprising some other number of elements surrounding the central reinforcing element can also be envisaged, for example eight or sixteen or twenty or indeed some other number, including odd numbers.

The optical fiber cable of the invention is a low cost cable of relatively small diameter and of relatively simple structure. The cable possesses good performance except in an environment that is very aggressive and very difficult. The cable is preferably for metropolitan type applications, i.e. in local networks, as contrasted with long distance transmission type applications. The cable may advantageously be used as a distribution cable, e.g. feeding a district of a city or a group of buildings, in which case the cable will be laid in a loop over a fraction of its length. The cable may advantageously also be used as an access cable, e.g. feeding a building or possibly even an individual dwelling.

The invention will be better understood and other features and advantages will appear on reading the following description and observing the accompanying drawing, given by way of example and in which:

FIG. 1 is a diagrammatic cross-section of an embodiment of an optical fiber cable of the invention.

FIG. 1 is a diagrammatic cross-section of an embodiment of an optical fiber cable of the invention. A central reinforcing element 1 is constituted by a central core 2 and by outer sheathing 3. A central core 2 has a diameter $\underline{d}$ and an outside surface 21. The outer sheathing 3 surrounds the central core 2. The outer sheathing 3 is in direct contact with the central core 2 via the surface 21. The outer sheathing 3 is mechanically coupled to the central core 2. The outer sheathing is of thickness es and has an outside surface 31.

A single annular layer of optical fibers 4 surrounds the outer sheathing 3. Each optical fiber is constituted firstly by an optical fiber proper 43 comprising a core and its cladding, and secondly by one or more coverings 44 applied during fiber drawing. The optical fibers 4 constituted by their optical fibers proper 43 and their coverings 44 are referred to as "bare" optical fibers. The diameter of the bare optical fibers 4 is written dfo. The optical fibers 4 are in contact with the outer sheathing 3 via its surface 31 and points of contact 45. The bare optical fibers 4 are mechanically coupled to the outer sheathing 3, which is itself mechanically coupled to the central core 2, and consequently the bare optical fibers 4 are mechanically coupled to the central core 2. In FIG. 1, the surface 31 is shown as being a circle; in reality, in order to obtain better mechanical coupling between the central reinforcing element 1 and the optical fibers 4, and more precisely between the central core 2 and the optical fibers 4, the optical fibers 4 are pressed with force against the outer sheathing 3 and therefore become impressed to some extent in the outer sheathing 3 which then presents shallow recesses in the zones of contact with the optical fibers 4. The optical fibers 4 may touch one another via contact surfaces 42, or they may alternatively be slightly spaced apart from one another, in which case the interstices 42 that are created are advantageously filled with the material of the buffer layer 5. If the optical fibers touch one another, it is important that they do not exert mechanical stresses against one another that are damaging for their optical transmission properties, and in particular for their attenuation. The circle circumscribing the optical fibers 4 is represented by a circular arc 41.

A buffer layer 5 surrounds the optical fibers 4. The buffer layer 5 is in contact with the optical fibers 4. The buffer layer 5 presses the optical fibers 4 against the outer sheathing 3. The buffer layer 5 coats the bare optical fibers 4 at least in part, filling all or part of the interstices 53 situated between the buffer layer 5 and the optical fibers 4. The interstices 52 situated between the outer sheathing 3 and the optical fibers 4 may also be filled with the material of the buffer layer 5, but, properly speaking, they do not form part of the buffer layer 5 which surrounds the layer of optical fibers 4. It is advantageous to fill all of the interstices in order to improve the leaktightness of the cable; in a variant that is not shown, the interstices 52 may be filled with a conventional hydrogen-absorbing grease, however the cable would then present the drawback of not being fully dry. The radial thickness of the buffer layer situated beyond the circle 41 circumscribing the layer of optical fibers 4 is written ect: as a general rule it is simpler to refer to this as the thickness of the buffer layer. The buffer layer 5 has an outside surface 51. At this outside surface 51, there may be reinforcing and wrapping roving 6. The roving 6 is fine, being wound helically or in an SZ configuration about the buffer layer 5: it cannot be seen in FIG. 1, where reference 6 merely indicates a location thereof. A separating tape 6 wound in the same manner could replace the roving 6. Under such circumstances, the tape 6 performs the same separation function and optionally the same wrapping function, but it no longer performs a reinforcing function.

The buffer layer 5, and where appropriate the roving 6, is surrounded by an outer sheath 7. The outer sheath 7 is in contact with the buffer layer 5 via its surface 51. The outside surface 71 of the outer sheath 7 comes into contact with the medium outside the cable. The thickness of the outer sheath 7 is written eg. The diameter of the outside surface 71 of the outer sheath 7 corresponds to the diameter D of the cable. The outer sheath 7 includes two notches 72 disposed symmetrically so as to improve the tearability of the outer sheath 7.

In FIG. 1, the proportions between the various elements are conserved. The diameter dfo of the bare optical fibers 4 is standardized at about 250 μm. The diameter D of this twelve optical fiber cable is about 2.1 mm. The diameter $\underline{d}$ of the central core 2 is about four times the thickness es of the outer sheathing 3. The thickness of the outer sheathing 3 is about 0.12 mm. The thickness ect of the buffer layer is about 0.12 mm. The thickness eg of the outer sheath 7 is about 0.25 mm.

What is claimed is:

1. An optical fiber cable comprising:
    a central reinforcing element (1);
    a layer of optical fibers (4) surrounding the central reinforcing element (1);
    a buffer layer (5) surrounding the layer of optical fibers (4); and
    an outer sheath (7) surrounding the buffer layer (5);
    wherein the layer of optical fibers is a single layer of bare optical fibers (4) surrounding the central reinforcing element (1);
    wherein the buffer layer (5) fills at least part of interstices between the single layer of optical fibers (4) and the outer sheath (7) and at least part of interstices between the bare optical fibers surrounding the central reinforcement element (1) such that the bare optical fibers are pressed into contact against the central reinforcing element (1) and mechanically coupled to the central reinforcing element (1);
    wherein the majority of the volume of the buffer layer (5) is constituted by a material that is both solid and flexible;
    wherein the central reinforcing element (1) comprises a central core (2) surrounded by an outer sheathing (3), the outer sheathing (3) is mechanically coupled to the central core (2) by contact with the central core (2), the modulus of elasticity of the outer sheathing (3) being less than the modulus of elasticity of the central core (2); and
    wherein the layer of optically fibers (4) is mechanically coupled to the central reinforcing element (1) such that the optical fibers (4) are at least partially impressed in the outer sheathing (3).

2. An optical fiber cable comprising:
    a central reinforcing element (1);
    a layer of optical fibers (4) surrounding the central reinforcing element (1);
    a buffer layer (5) surrounding the layer of optical fibers (4); and
    an outer sheath (7) surrounding the buffer layer (5);
    wherein the layer of optical fibers is a single layer of bare optical fibers (4) surrounding the central reinforcing element (1);
    wherein the buffer layer (5) fills at least part of interstices between the single layer of optical fibers (4) and the outer sheath (7) and at least part of interstices between the bare optical fibers surrounding the central reinforcing element (1) such that the bare optical fibers are pressed against the central reinforcing element (1) and mechanically coupled to the central reinforcing element (1) by contact between the bare optical fibers (4) and the central reinforcing element (1), said mechanical coupling reducing relative longitudinal movements between the optical fibers (4) and the central reinforcing element (1) during temperature variations of the cable; and wherein the portion of the buffer layer (5) in contact with the bare optical fibers (4) is constituted by a material that is both solid and flexible so as to withstand radial flattening without exerting damaging mechanical stress on said optical fibers (4);

wherein the central reinforcing element (1) comprises a central core (2) surrounded by an outer sheathing (3), the outer sheathing (3) is mechanically coupled to the central core (2) by contact with the central core (2), the modulus of elasticity of the outer sheathing (3) being less than the modulus of elasticity of the central core (2); and wherein the layer of optically fibers (4) is mechanically coupled to the central reinforcing element (1) such that the optical fibers (4) are at least partially impressed in the outer sheathing (3).

3. An optical fiber cable comprising:

a central reinforcing clement (1);

a plurality of optical fibers (4) surrounding the central reinforcing element (1); and a buffer layer surrounding the plurality of optical fibers;

wherein the layer of optical fibers is a single layer of bare optical fibers (4) surrounding the central reinforcing element (1);

wherein the buffer layer (5) fills at least part of interstices between the bare optical fibers surrounding the central reinforcement element (1) such that the bare optical fibers are pressed in contact against the central reinforcing element (1) and mechanically coupled to the reinforcing element (1);

wherein the central reinforcing element (1) comprises a central core (2) surrounded by an outer sheathing (3), the outer sheathing (3) is mechanically coupled to the central core (2) by contact with the central core (2), the modulus of elasticity of the outer sheathing (3) being less than the modulus of elasticity of the central core (2); and wherein the layer of optically fibers (4) is mechanically coupled to the central reinforcing element (1) such that the optical fibers (4) are at least partially impressed in the outer sheathing (3).

4. An optical fiber cable according to claim 1, characterized in that the buffer layer (5) is mechanically coupled to the optical fibers (4) that it surrounds.

5. An optical fiber cable according to claim 1, characterized in that the cable includes reinforcing and wrapping roving (6) disposed helically about the buffer layer (5) and in contact with the buffer layer (5).

6. An optical fiber cable according to claim 1, characterized in that the cable includes a separator tape (6) disposed helically around the buffer layer (5) and in contact with the buffer layer (5).

7. An optical fiber cable according to claim 1, characterized in that the solid and flexible material of the buffer layer (5) has a Young's modulus at 25° C. which is less than 150 MPa.

8. An optical fiber cable according to claim 7, characterized in that the solid and flexible material of the buffer layer (5) has a Young's modulus at 25° C. which is less than 100 MPa.

9. An optical fiber cable according to claim 7, characterized in that the solid and flexible material of the buffer layer (5) is a solid and non-perforated elastic material.

10. An optical fiber cable according to claim 7, characterized in that the solid and flexible material of the buffer layer (5) is a foam.

11. An optical fiber cable according to claim 1, characterized in that the buffer layer (5) is constituted exclusively by a single material.

12. An optical fiber cable according to claim 1, characterized in that the radial thickness (ect) of the portion of the buffer layer (5) situated outside the circle (41) circumscribing the layer of optical fibers (4) is small enough for the buffer layer (5) to be easily tearable without a tool.

13. An optical fiber cable according to claim 12, characterized in that the radial thickness (ect) of the portion of the buffer layer (5) situated outside the circle (41) circumscribing the layer of optical fibers (4) lies in the range 0.1 mm to 0.5 mm.

14. An optical fiber cable according to claim 13, characterized in that the radial thickness (ect) of the portion of the buffer layer (5) situated outside the circle (41) circumscribing the layer of optical fibers (4) lies in the range 0.15 mm to 0.40 mm.

15. An optical fiber cable according to claim 12, characterized in that the radial thickness (ect) of the portion of the buffer layer (5) situated outside the circle (41) circumscribing the layer of optical fibers (4) is less than the diameter (dfo) of a bare optical fiber (4).

16. An optical fiber cable according to claim 1, characterized in that the layer of optical fibers (4) comprises both optical fibers and some filler elements.

17. An optical fiber cable according to claim 1, characterized in that the optical fibers (4) are disposed helically or in an SZ configuration about the central reinforcing element (1).

18. An optical fiber cable according to claim 1, characterized in that the central core (2) has a modulus of elasticity that is high enough to withstand traction exerted on the cable, and in that the outer sheathing (3) has a modulus of elasticity that is small enough to absorb at least in part the radial mechanical stresses exerted by the central core (2) on the optical fibers (4).

19. An optical fiber cable according to claim 1, characterized in that the ratio between the diameter (d) of the central core (2) and the thickness (es) of the outer sheathing (3) is high enough to ensure that the behavior of the central reinforcing element (1) in response to variations in the temperature of the cable is closer to that of the central core (2) than to that of the outer sheathing (3).

20. An optical fiber cable according to claim 1, characterized in that the ratio between the diameter (d) of the central core (2) and the thickness (es) of the outer sheathing (3) is greater than 4.

21. An optical fiber cable according to claim 1, characterized in that the cable also comprises wrapping means (6) for reinforcing the force with which the bare optical fibers (4) are pressed against the central reinforcing element (1).

22. An optical fiber cable according to claim 1, characterized in that no liquid, viscous, or semi-liquid element is in contact with the optical fibers (4).

23. An optical fiber cable according to claim 22, characterized n that the cable does not include any liquid, viscous, or semi-liquid element.

24. An optical fiber cable according to claim 1, characterized in that a liquid separator is disposed at the interface between the bare optical fibers (4) and the central reinforcing element (1) in just sufficient quantity to prevent damage to the optical fibers (4) while they are being assembled around the central reinforcing element (1).

25. An optical fiber cable according to claim 1, characterized in that the cable is constituted, successively from the center towards the periphery, by: a central reinforcing element (1) comprising a central core (2) surrounded by outer sheathing (3); a layer of optical fibers (4); a buffer layer (5) of solid and flexible material optionally including reinforcing roving; optional wrapping roving (6) also capable of acting as reinforcement; and an outer sheath (7).

26. An optical fiber cable according to claim 1, characterized in that the cable is constituted successively from the center towards the periphery by: a central reinforcing element (1) comprising a central core (2) surrounded by outer sheathing (3); a layer of optical fibers (4); a buffer layer (5) constituted by a single solid and flexible material; and an outer sheath (7).

27. An optical fiber cable according to claim 1, characterized in that the cable is a distribution cable.

28. An optical fiber cable according to claim 1, characterized in that the cable is an access cable.

29. An optical fiber cable according to claim 2, characterized in that the buffer layer (5) is mechanically coupled to the optical fibers (4) that it surrounds.

30. An optical fiber cable according to claim 2, characterized in that the buffer layer (5) is constituted exclusively by a single material.

31. An optical fiber cable according to claim 2, characterized in that no liquid, viscous, or semi-liquid element is in contact with the optical fibers (4).

32. An optical fiber cable according to claim 3, characterized in that the central reinforcing element (1) comprises a central core (2) surrounded by outer sheathing (3), in that the outer sheathing (3) is mechanically coupled to the central core (2) by contact with the central core (2), and in that the modulus of elasticity of the outer sheathing (3) is less than the modulus of elasticity of the central core (2).

33. An optical fiber cable according to claim 3, characterized in that the central core (2) has a modulus of elasticity that is high enough to withstand traction exerted on the cable, and in that the outer sheathing (3) has a modulus of elasticity that is small enough to absorb at least in part the radial mechanical stresses exerted by the central core (2) on the optical fibers (4).

34. An optical fiber cable according to claim 3, characterized in that no liquid, viscous, or semi-liquid element is in contact with the optical fibers (4).

35. An optical fiber cable according to claim 3, characterized in that the cable is constituted, successively from the center towards the periphery, by: a central reinforcing element (1) comprising a central core (2) surrounded by outer sheathing (3); a layer of optical fibers (4); a buffer layer (5) of solid and flexible material optionally including reinforcing roving; optional wrapping roving (6) also capable of acting as reinforcement; and an outer sheath (7).

36. An optical fiber cable according to claim 3, characterized in that the cable is constituted successively from the center towards the periphery by: a central reinforcing element (1) comprising a central core (2) surrounded by outer sheathing (3); a layer of optical fibers (4); a buffer layer (5) constituted by a single solid and flexible material; and an outer sheath (7).

37. An optical fiber cable according to claim 3, characterized in that the cable includes no more than six optical fibers (4), and in that the outside diameter (D) of the cable is less than 2 mm.

38. An optical fiber cable according to claim 3, characterized in that the cable includes no more than twelve optical fibers (4), and in that the outside diameter (D) of the cable is less than 2.5 mm.

39. An optical fiber cable according to claim 3, characterized in that the cable includes no more than twenty-four optical fibers (4), and in that the outside diameter (D) of the cable is less than 3.5 mm.

40. An optical fiber cable according to claim 3, characterized in that the cable is a distribution cable.

41. An optical fiber cable according to claim 3, characterized in that the cable is an access cable.

42. An optical fiber cable according to claim 1, wherein the optical fibers (4) are at least partially impressed in the outer sheathing (3) such that shallow recesses are formed in the outer sheathing (3) at zones of contact with the optical fibers (4).

43. An optical fiber cable according to claim 1, wherein the ratio between the modulus of elasticity of the central core (2) and the modulus elasticity of the outer sheathing (3) is greater than 10.

44. An optical fiber cable according to claim 2, wherein the optical fibers (4) are at least partially impressed in the outer sheathing (3) such that shallow recesses are formed in the outer sheathing (3) at zones of contact with the optical fibers (4).

45. An optical fiber cable according to claim 2, wherein the ratio between the modulus of elasticity of the central core (2) and the modulus elasticity of the outer sheathing (3) is greater than 10.

46. An optical fiber according to claim 2, characterized in that the ratio between the diameter (d) of the central core (2) and the thickness (es) of the outer sheathing (3) is greater than 4.

47. An optical fiber cable according to claim 3, wherein the optical fibers (4) are at least partially impressed in the outer sheathing (3) such that shallow recesses are formed in the outer sheathing (3) at zones of contact with the optical fibers (4).

48. An optical fiber cable according to claim 3, wherein the ratio between the modulus of elasticity of the central core (2) and the modulus elasticity of the outer sheathing (3) is greater than 10.

49. An optical fiber according to claim 16, characterized in that the ratio between the diameter (d) of the central core (2) and the thickness (es) of the outer sheathing (3) is greater than 4.

* * * * *